US012440919B2

United States Patent
Eimann et al.

(10) Patent No.: US 12,440,919 B2
(45) Date of Patent: Oct. 14, 2025

(54) METHOD FOR MAKING AN INDUSTRIAL TOOL, SUCH AS AN ANVIL ROLL

(71) Applicant: The Procter & Gamble Company, Cincinnati, OH (US)

(72) Inventors: Klaus Eimann, Zellingen (DE); Uwe Schneider, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 285 days.

(21) Appl. No.: 16/689,180

(22) Filed: Nov. 20, 2019

(65) Prior Publication Data
US 2020/0180025 A1   Jun. 11, 2020

(30) Foreign Application Priority Data

Dec. 10, 2018   (EP) ..................................... 18211337
Nov. 6, 2019    (EP) ..................................... 19207404

(51) Int. Cl.
*B23K 26/0622*   (2014.01)
*B22F 10/25*     (2021.01)
(Continued)

(52) U.S. Cl.
CPC .......... *B23K 26/0622* (2015.10); *B22F 10/25* (2021.01); *B22F 12/43* (2021.01);
(Continued)

(58) Field of Classification Search
CPC ........ B22F 10/25; B23K 26/34; B23K 36/342
See application file for complete search history.

(56) References Cited

U.S. PATENT DOCUMENTS 3,113,225 A   12/1963   Claus
3,562,041 A   2/1971    Robertson
(Continued)

FOREIGN PATENT DOCUMENTS

CN   108349004 A  *  7/2018   ........... B21D 22/022
EP   1635750 B1      3/2006
(Continued)

OTHER PUBLICATIONS

Protolabs, Design Guildelines: Direct Metal Laser Sintering, https://www.protolabs.com/services/3d-printing/direct-metal-laser-sintering/design-guidelines/ 2018 (Year: 2018).*
(Continued)

*Primary Examiner* — Jonathan Johnson
(74) *Attorney, Agent, or Firm* — Gregory P. Habiak; Christian M. Best

(57) ABSTRACT

The present invention relates to a method for making an anvil roll, the method comprising the steps of: providing a cylindrically-shaped body consisting of a first material, wherein the first material is selected from the group consisting of: an iron alloy, an aluminum alloy, and a titanium alloy, and wherein the body comprises an outer circumferential surface; adding one or more metallic materials in the form of powder; and fusing, by applying power from a laser source, the one or more metallic materials to the outer circumferential surface of the body to form a plurality of protrusions having a conical or frustro-conical shape comprising tapering sides, from a broader base at the outer circumferential surface tapering outwardly towards a narrower tip or having a cylindrical shape.

20 Claims, 6 Drawing Sheets

(51) Int. Cl.
  B22F 12/43 (2021.01)
  B26D 7/20 (2006.01)
  B22F 10/66 (2021.01)
  B33Y 10/00 (2015.01)
  B33Y 80/00 (2015.01)

(52) U.S. Cl.
  CPC .............. B26D 7/204 (2013.01); *B22F 10/66* (2021.01); *B22F 2302/10* (2013.01); *B22F 2304/10* (2013.01); *B33Y 10/00* (2014.12); *B33Y 80/00* (2014.12)

(56) References Cited

U.S. PATENT DOCUMENTS

| | | | |
|---|---|---|---|
| 3,733,238 A | 5/1973 | Long | |
| 4,493,868 A | 1/1985 | Meitner | |
| 4,854,984 A | 8/1989 | Ball | |
| 5,110,403 A | 5/1992 | Ehlert | |
| 5,620,779 A | 4/1997 | Levy | |
| 5,798,167 A | 8/1998 | Connor | |
| 5,837,960 A | 11/1998 | Lewis et al. | |
| 5,855,149 A * | 1/1999 | Islam | C23C 24/10 76/115 |
| 6,036,796 A | 3/2000 | Halbert | |
| 6,244,148 B1 | 6/2001 | Vees | |
| 6,248,195 B1 | 6/2001 | Schmitz | |
| 6,508,641 B1 | 1/2003 | Kubik | |
| 6,645,330 B2 | 11/2003 | Pargass | |
| 7,777,094 B2 | 8/2010 | Mori | |
| 7,861,756 B2 | 1/2011 | Jenquin | |
| 8,440,043 B1 | 5/2013 | Schneider | |
| 8,759,278 B2 | 6/2014 | Corominas et al. | |
| 2006/0042436 A1* | 3/2006 | Closmann | B22F 12/44 83/13 |
| 2011/0237490 A1 | 9/2011 | King et al. | |
| 2012/0079926 A1 | 4/2012 | Long | |
| 2012/0132627 A1 | 5/2012 | Wescott et al. | |
| 2013/0049438 A1 | 2/2013 | Nootbaar | |
| 2013/0213547 A1 | 8/2013 | Schneider et al. | |
| 2013/0218116 A1 | 8/2013 | Schneider | |
| 2014/0217058 A1 | 8/2014 | Boegli | |
| 2015/0159119 A1 | 6/2015 | Fernandez-prieto | |
| 2017/0144248 A1 | 5/2017 | Yoshimura et al. | |
| 2017/0151611 A1 | 6/2017 | Secondi | |
| 2017/0211017 A1 | 7/2017 | Sivik | |
| 2018/0133839 A1 | 5/2018 | Shigeta | |
| 2018/0257141 A1* | 9/2018 | Hofmann | B22F 10/14 |
| 2019/0263056 A1 | 8/2019 | Motoyama et al. | |

FOREIGN PATENT DOCUMENTS

| | | | | |
|---|---|---|---|---|
| EP | | 3305494 A4 | 1/2019 | |
| WO | WO-2016012827 A1 * | | 1/2016 | ............ B22F 3/1055 |

OTHER PUBLICATIONS

Precipart, Micro 3D Printing & Micro Laser Sintering, https://www.precipart.com/products-capabilities/custom-mechanical-components/micro-3d-printing/ 2018 (Year: 2018).*
European Search Report, dated Jun. 24, 2019, 6 pages.
Extended European Search Report and Search Opinion; Application No. 19207404.5; dated May 4, 2020; 8 pages.

* cited by examiner

METHOD FOR MAKING AN INDUSTRIAL TOOL, SUCH AS AN ANVIL ROLL

CROSS REFERENCE TO RELATED APPLICATION

This application claims priority under 35 U.S.C. § 119 to European Patent Application Serial No. 18211337.3, filed on Dec. 10, 2018, the entire disclosure of which is hereby incorporated by reference.

FIELD OF THE INVENTION

The present invention relates to a method of manufacturing tools, in particular industrial tools, such as anvil rolls, by adding metal components which are metallurgically combined to form structures, such as protrusions.

BACKGROUND OF THE INVENTION

Laser cladding, or laser metal deposition, is an additive production process that uses a laser beam to form a pool of melted metal on the surface of a metallic substrate into which metal powder is injected using a gas stream. The absorbed metal powder melts and bonds with the base material to produce a deposit on the surface.

US2013/0049438, published on Feb. 28, 2013, discloses laser cladding processes for the manufacture of abrasion resistant cutting tools.

Currently, the laser cladding process is typically followed by a post-machining step to bring the added metal structure within required tolerances. Post-machining such as milling, grinding and/or spark erosion may be used. However post-machining adds further expense to the overall process.

It would be desirable to deposit metal with sufficient accuracy to avoid, or at least to reduce, the need for further post-machining steps.

SUMMARY OF THE INVENTION

The present invention relates to a method for making an anvil roll, the method comprising the steps of:
  providing a cylindrically-shaped body consisting of a first material, wherein the first material is selected from the group consisting of: an iron-based alloy, a nickel-based alloy, an aluminium-based alloy, and a titanium-based alloy, and wherein the body comprises an outer circumferential surface;
  adding one or more metallic materials in the form of powder, the one or more metallic materials being different from the first material; and
  fusing, by applying power from a laser source, the one or more metallic materials to the outer circumferential surface of the body to form a plurality of protrusions having a conical or frustro-conical shape comprising generally tapering sides, from a broader base at the outer circumferential surface tapering outwardly towards a narrower tip, or having a cylindrical shape.

DETAILED DESCRIPTION OF THE INVENTION

Figure 1:
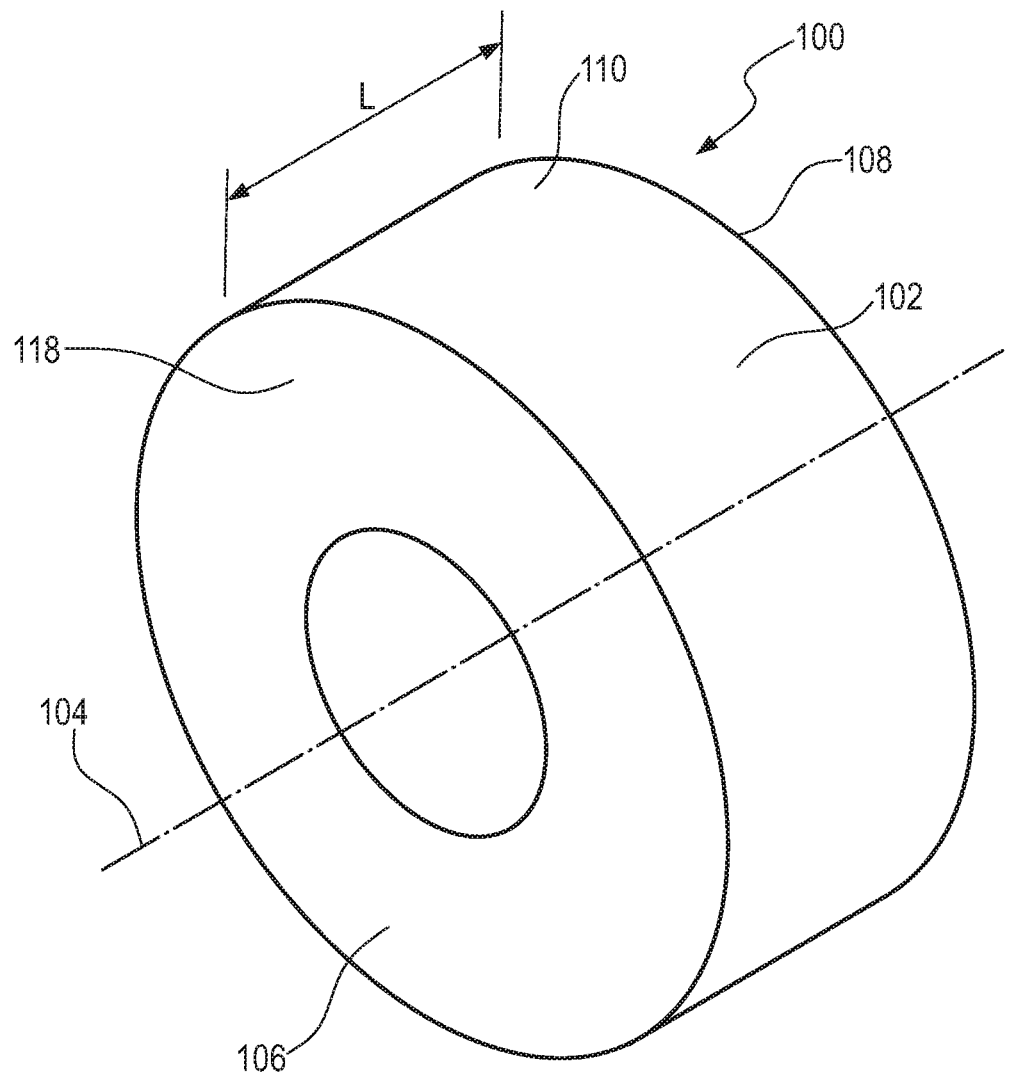
FIG. 1 is an isometric view of a forging of a body of an anvil roll.

The following term explanations may be useful in understanding the present disclosure:

"Anvil roll" is used herein to refer to any industrial tool comprising an essentially cylindrical form having a pattern or profile on the outer circumferential surface.

"Absorbent article" is used herein to refer to consumer products whose primary function is to absorb and retain soils and wastes. "Diaper" is used herein to refer to an absorbent article generally worn by infants and incontinent persons about the lower torso. The term "disposable" is used herein to describe absorbent articles which generally are not intended to be laundered or otherwise restored or reused as an absorbent article (e.g., they are intended to be discarded after a single use and may also be configured to be recycled, composted or otherwise disposed of in an environmentally compatible manner).

An "elastic," "elastomer" or "elastomeric" refers to materials exhibiting elastic properties, which include any material that upon application of a force to its relaxed, initial length can stretch or elongate to an elongated length more than 10% greater than its initial length and will substantially recover back to about its initial length upon release of the applied force.

As used herein, the term "joined" encompasses configurations whereby an element is directly secured to another element by affixing the element directly to the other element, and configurations whereby an element is indirectly secured to another element by affixing the element to intermediate member(s) which in turn are affixed to the other element.

The term "substrate" is used herein to describe a material which is primarily two-dimensional (i.e. in an XY plane) and whose thickness (in a Z direction) is relatively small (i.e. ⅒ or less) in comparison to its length (in an X direction) and width (in a Y direction). Non-limiting examples of substrates include a web, layer or layers or fibrous materials, nonwovens, films and foils such as polymeric films or metallic foils. These materials may be used alone or may comprise two or more layers laminated together. As such, a web is a substrate.

The term "nonwoven" refers herein to a material made from continuous (long) filaments (fibers) and/or discontinuous (short) filaments (fibers) by processes such as spunbonding, meltblowing, carding, and the like. Nonwovens do not have a woven or knitted filament pattern.

The term "machine direction" (MD) is used herein to refer to the direction of material flow through a process. In addition, relative placement and movement of material can be described as flowing in the machine direction through a process from upstream in the process to downstream in the process.

The term "cross direction" (CD) is used herein to refer to a direction that is generally perpendicular to the machine direction.

The present disclosure relates to apparatuses and methods for manufacturing absorbent articles, and more particularly to the manufacture of industrial tools such as rotary anvils that may be used in combination with a tool member or an ultrasonic horn to perform various types of manufacturing operations, such as cutting, bonding, and embossing. Particular aspects of the present disclosure involve an anvil roll having a cylindrically-shaped outer circumferential surface and being adapted to rotate about a first axis of rotation. The anvil roll includes a body formed from a first material, such as a metallic material.

According to the present invention one or more metallic materials in the form of powder are added to the outer circumferential surface to form raised protrusions. Preferably the metallic material comprises wear resistant material which preferably is different from the first material of the body, although materials of similar or even identical characteristics may be used. The term "wear resistant" is used herein to mean resistance against several different failure mechanisms including abrasion, fatigue, chipping/microchipping and yielding. The metallurgy of the protrusion may be tailored to balance the requirements of these different types of failure.

As discussed in more detail below, a tool member may be positioned adjacent the anvil roll and adapted to rotate about a second axis of rotation. During operation, the anvil roll and the tool member rotate in opposite directions such that a nip is formed between raised protrusions on the outer circumferential surface of the anvil roll and the tool member. Alternatively the anvil roll may be positioned adjacent to an ultrasonic horn which may be either a static or a rotary ultrasonic horn. As discussed in more detail below, because the protrusions of metallic material are formed on and fused by applying power from a laser source, to the body as opposed to being separately fabricated and/or fastened thereto, some of the difficulties associated with current anvil roll manufacturing techniques may be alleviated.

The protrusions of metallic material are defined herein as "conical" or "frustro-conical" or "cylindrical". The cross-section of the protrusions may be of any desired shape such as square, rectangular, oval, elliptical, or preferably circular. Preferably the height of the protrusions, measured in the direction radially outwards from the outer circumferential surface of the anvil roll, is from about 0.1 mm to about 2 mm, and more preferably from about 0.5 mm to about 1 mm.

Preferably the metallic powder material is applied in layers, and the laser is operated by pulsing the laser and by synchronizing the pulses with the application of successive layers of the powder material.

In a preferred process a pool of molten material is formed in the target area by a pulse of energy from the laser. Metallic powder material is fed into the pool of molten material using a high precision nozzle, preferably by a coaxial feeder nozzle. The particle size of the powder is smaller than the diameter of the pool of molten material, and smaller than the diameter of the laser beam in order to completely melt the powder material. Incomplete melting of the powder material would lead to undesirable surface roughness.

Moreover the powder flow is preferably controlled by a rapid powder switch such as the switch described in Photonics Views journal on-line: "Powder on Demand: Rapid-Powder-Switch", Nov. 23, 2017.

The process is repeated starting with a subsequent pulse of energy from the laser which remelts the target area. Preferably the pulse time is between about 30 and 350 milliseconds.

Accordingly the flow of powder and the laser pulse are synchronised so that the projection is built up in layers. Powder flow and laser pulses build up the layers. Between successive layers the powder flow is stopped and laser pulse(s) smooth each layer to a high degree of dimensional accuracy.

Whereas protrusions formed using known laser cladding techniques have rough surfaces at the sides of the protrusion caused by the presence of particulate material which has not been melted, or only partly melted, during the laser deposition process, in contrast the protrusions formed by the present invention have smooth side surfaces because all of the particulate material has been melted during the laser deposition process.

The thickness of successive layers of metallic powder material is preferably less than 0.1 mm, and more preferably from 0.01 to 0.07 mm. Preferably the volumetric flow rate of the metallic powder material is from 2 to 10 $cm^3$/hour. A dimensional accuracy of the tapering sides of the protrusions within a tolerance of 20 micrometers is achievable.

Such high dimensional accuracy may be desirable because it makes any further machining step to the conical or frustro-conical tapering sides of the protrusions unnecessary. Nevertheless, according to one embodiment of the present invention, a further machining step or steps may be applied the circumferential surface formed by the outer tips of the protrusions 180. In a preferred embodiment a process of grinding the outer diameter to fine dimensional tolerance may be performed. Furthermore, further refining processes such as polishing, wet blasting, brushing or others may be performed to smoothen the surfaces of the tips which form the working surfaces of the protrusions. It is intended that the invention described herein does not require any further machining steps to the conical or frustro-conical tapering sides of the protrusions to be performed.

Figure 2:
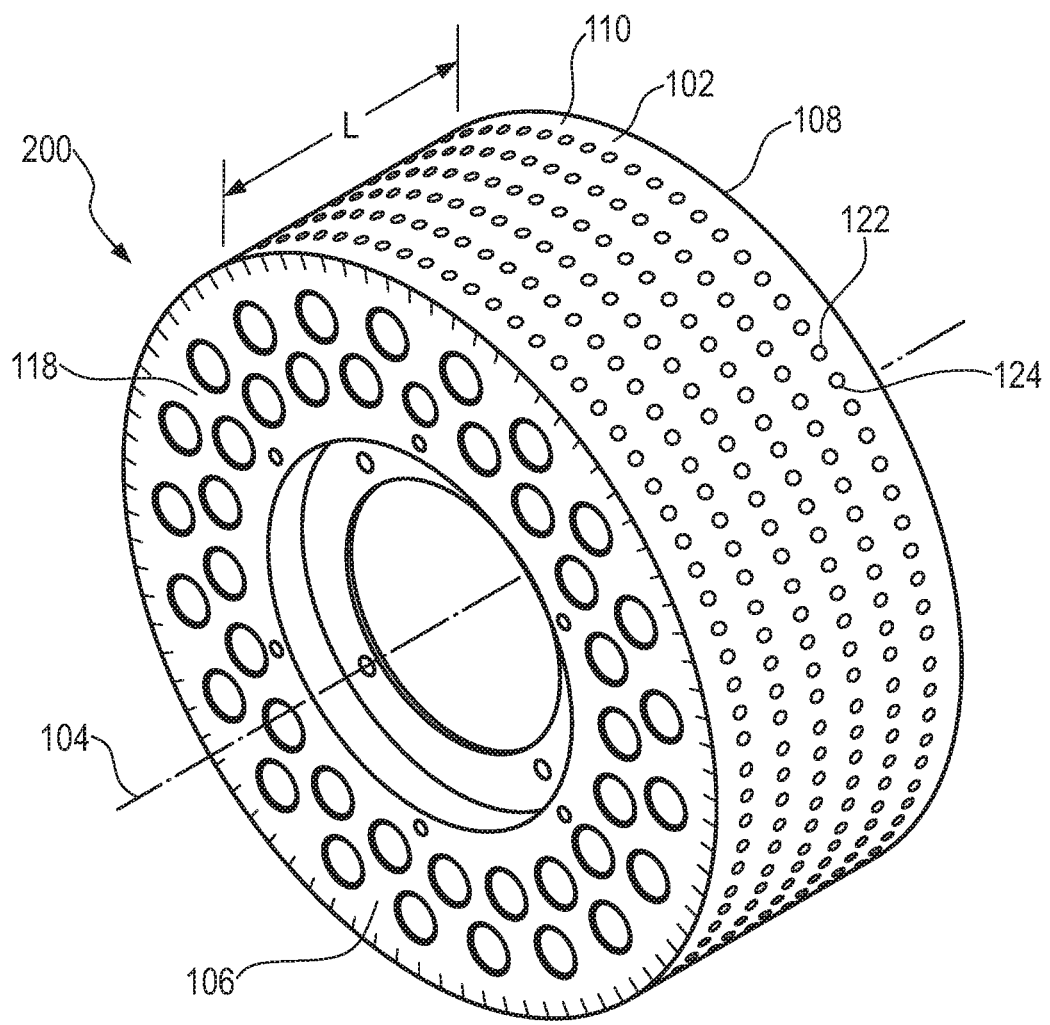
FIG. 2 is an isometric view of a body of an anvil roll.

It is to be appreciated the anvil rolls herein may be configured in various ways. For example, FIG. 1 shows an isometric view of a configuration of an anvil roll 100 having a cylindrically-shaped outer circumferential surface 102 and adapted to rotate about a first axis of rotation 104. The anvil roll 100 may extend axially for a length L between a first end 106 and a second end 108. As discussed in more detail below, the body 110 may be configured as a unitary member made from a first material 118. With reference to FIG. 2, the anvil roll 200 includes one or more holes 122 in the outer circumferential surface 102. More particularly, each hole 122 defines a perimeter 124 in the second portion of the outer circumferential surface 102 and extends radially inward from the outer circumferential surface 102 into the body 110. A vacuum source may be in fluid communication with the holes 122. As such, the vacuum source may create vacuum air pressure in the holes 122 during operation to help hold substrates in a desired position on the outer circumferential surface 102 of the anvil roll 200.

Although the holes 122 are sometimes depicted as being arranged in rows extending axially along the outer circumferential surface 102 of the anvil roll, it is to be appreciated that the holes 122 may be arranged in various ways and may be configured to have the same or different shapes and/or sizes. It is also to be appreciated that various types of one or more vacuum sources and arrangements thereof may be used with the anvil roll 200.

It is to be appreciated that the first material 118 may be various types of materials, such as various types of metallic materials. For example, in some configurations, the first material 118 is selected from the group consisting of: an iron-based alloy, a nickel-based alloy, an aluminum-based alloy, and a titanium-based alloy. In some configurations, the iron-based alloy is selected from the group consisting of: stainless steel and tool steel. In some configurations, the first material is a hot-working tool steel or a tool steel, such as for example, X37CrMoVS-1 steel. It is also to be appreciated that the one or more wear resistant materials 120 may be various types of materials. For example, the one or more wear resistant materials 120 may include at least one of: powder-metallurgical steel; titanium carbide, niobium carbide, tantalum carbide, chromium carbide, tungsten carbide, and mixtures thereof. The wear resistant material 120 may include a carbide of at least one element of the fourth, the fifth, the sixth and/or the seventh group of the periodic table. Carbides from the fourth group may be titanium carbide, zirconium carbide, hafnium carbide or a mixture thereof. Carbides from the fifth group may be vanadium carbide, niobium carbide, tantalum carbide or a mixture thereof. Carbides from the sixth group may be chromium carbide, molybdenum carbide, tungsten carbide or a mixture thereof. Carbides from the seventh group may be manganese carbide, rhenium carbide or a mixture thereof. Carbides of several groups can be used individually or as a mixture. In one embodiment, titanium carbide, niobium carbide, tantalum carbide, chromium carbide, tungsten carbide or a mixture thereof is used. The carbides may be deposited as a powder comprising particles of several sizes and/or shapes. Carbides may be provided in a matrix material, wherein matrix material may comprise nickel, cobalt and/or iron. The carbides may be present in the matrix material in an amount of from about 60% to about 80%, in another embodiment in an amount of from about 70% to about 80%, in yet another embodiment in an amount of from about 70% to about 75%.

The metallic materials are added in the form of powder. Preferably the average diameter of the metallic powder material is less than about 60 micrometers, and more preferably from about 20 to about 50 micrometers.

When assembling the anvil rolls 100, 200 herein, the first material 118 may be formed into a generally cylindrically-shaped forging, such as shown in FIG. 1. The forging may be machined or otherwise worked to form the body 110. For example, the forging may be worked or machined into the body 110 so as to include various features, such as holes 122, such as shown in FIG. 2. Holes in the body may extend radially inward from the outer circumferential surface, wherein the holes are in fluid communication with a vacuum pressure source. Although anvils described herein may include vacuum, it is appreciated that anvils herein may be configured without vacuum.

Figure 3A:
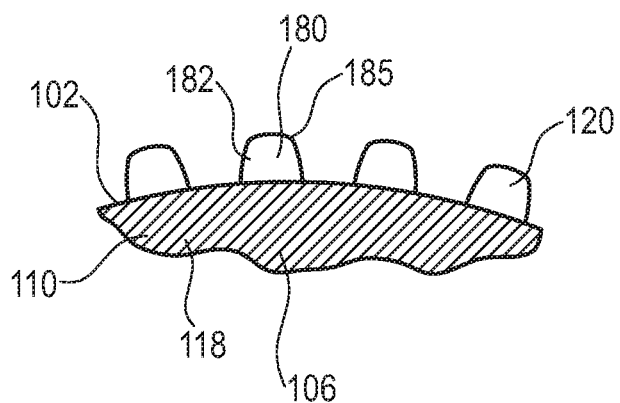
FIG. 3A is a side view of the body further showing projections.
Figure 3B:
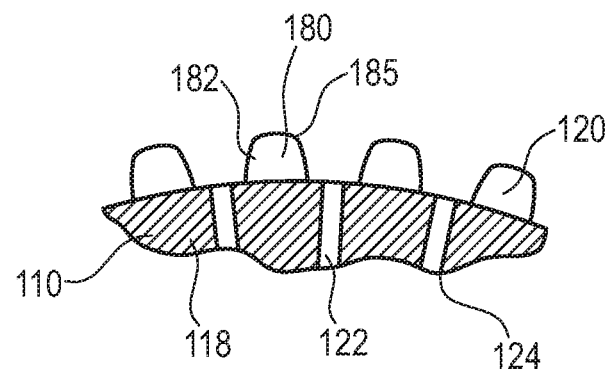
FIG. 3B is a sectional view of the body from FIG. 3 further showing projections.

As previously mentioned, one or more metallic materials 120 are fused to the body 110, such as shown in FIGS. 3A and 3B. Preferably the one or more metallic materials are fused onto the outer circumferential surface of the body to form a plurality of protrusions 180 having a conical or frustro-conical shape comprising generally tapering sides 182, from a broader base at the outer circumferential surface 102 tapering outwardly towards a narrower tip 185. The generally tapering sides 182 may be uniformly tapering between the base and the tip 185, i.e. geometrically defining a part of a cone, or alternatively the generally tapering sides 182 may be non-uniformly tapering between the base and the tip 185 or may not be tapered, e.g. cylindrical.

One or more metallic materials 120 are fused to the body 110 with a laser cladding process, such as disclosed in U.S. Patent Publication No. 2013/0049438 A1. During the laser cladding process, the first material 118 of the body 110 may be partially melted during deposition of the metallic material 120. As such, a metallurgic bond may be created between the metallic material 120 and the first material 118 of the body 110. As used herein, a "metallurgical bond" means that the metallic material is fused to the first material of the body such that the microstructure of the first material may be intimately linked to the microstructure of the metallic material. In some configurations when applying more than one metallic material, metallurgic bonds may be also created between the different wear resistant materials.

The metallic material may include multiple layers of material, such as layers of different material, that are applied to the body 110, such as disclosed in U.S. Patent Publication No. 2013/0049438 A1. For example, the metallic material may include a first layer, a second layer, and a third layer, wherein the first layer may be referred to as a bonding layer, the second layer may be referred to as a bearing layer, and the third layer may be referred to as a wear resistant layer. The bonding layer may be applied to the body 110; the bearing layer may be applied to the bonding layer; and the wear resistant layer may be applied to the bearing layer. Thus, the first layer or bonding layer may provide a metallurgical bond to the body 110 when applied by a laser cladding process. As such, the bonding layer may be a metal alloy that is similar to the first material 118 of the body 110, which in turn, may form little or no brittle phase when mixed with the first material 120. The second layer or bearing layer may be configured to provide sufficient strength and stiffness when the wear resistant layer is loaded during operation. Thus, the second layer or bearing layers may be a metallic alloy that is similar to the bonding layer but contains elements to form solid solutions and/or medium hard phases. The third layer or wear resistant layer may be a compound of a matrix in which hard phases, such as for example carbides, borides and/or nitrides, are embedded. The matrix may be a metallic alloy which is similar to the bearing layer but also contains elements to form a solid solution and/or medium hard phases, and also be identical with the bearing layer. The hard phases may be homogeneously distributed inside the metallic matrix in various amounts. The hard phases may also be incorporated as solid particles during the coating process or may precipitate during the solidification process from the melt.

The laser energy applied to successive layers may be the same energy per layer or may be different energy per layer. Preferably the laser energy is higher for the base layer(s), nearer to the body of the anvil roll, and the laser energy is lower for the layer(s) further from the anvil roll.

Figure 4:
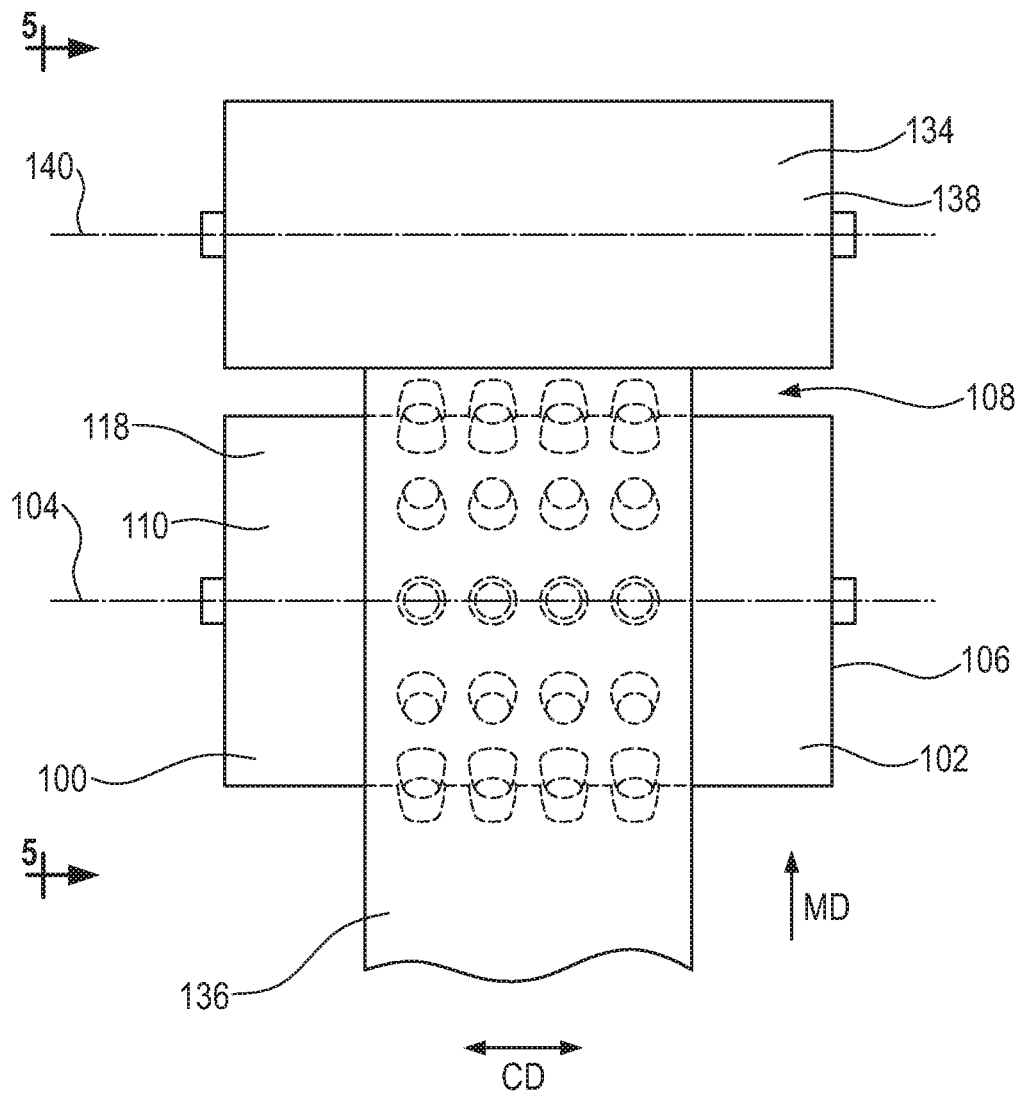
FIG. 4 is a schematic side view of a substrate advancing between an anvil roll and a tool member.
Figure 5:
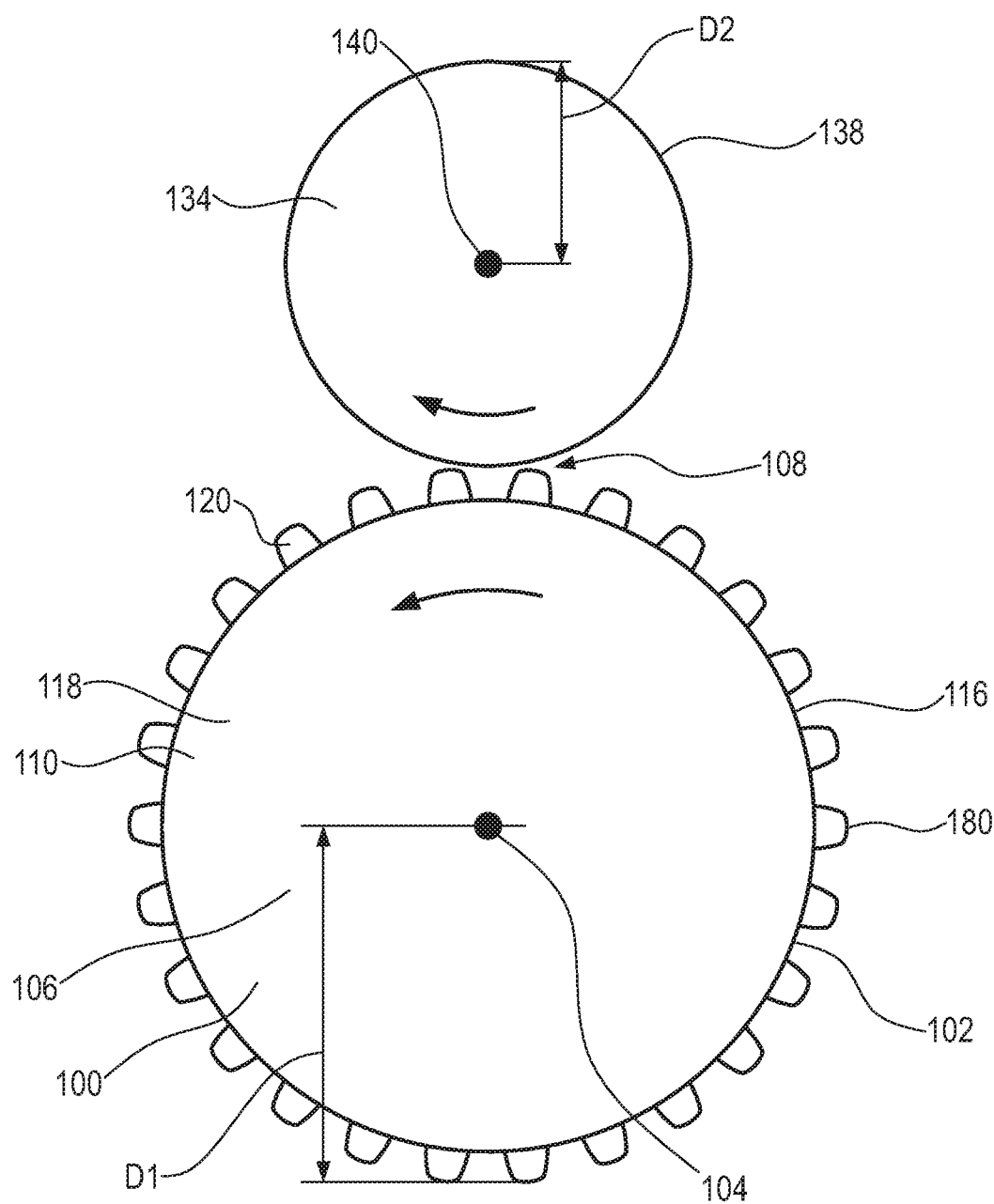
FIG. 5 is a side view of an anvil roll and a tool member.

As previously mentioned, the anvil roll 100 may be used in combination with a tool member 134, such as shown in FIG. 4, to perform various types of manufacturing operations on an advancing substrate. As shown in FIGS. 4 and 5, the tool member 134 may include an outer circumferential surface 138 and may be adapted to rotate about a second axis of rotation 140. The tool member 134 may be positioned adjacent the anvil roll 100 to define a nip 108. The tool member 134 and the anvil roll 100 may be adapted to rotate in opposite directions such that the outer tips of the protrusions 180 may contact the outer circumferential surface 138 of the tool member 134, or, alternatively, a narrow clearance or nip 108 may be formed between the outer tips of the protrusions 180 and the outer circumferential surface 138 of the tool member 134. As shown in FIG. 4, the substrate 136 may advance in the machine direction MD through the nip 108 such that the substrate 136 is impinged upon between the outer circumferential surface 138 of the tool member 134 and the projections 180 of wear resistant material 120.

FIG. 5 is a side view of an anvil roll 100 in combination with a tool member 134. The anvil roll 100 including projections 180 has a radius, D1, and the tool member has a radius, D2. It is to be appreciated that the tool member 134 may be configured to perform various types of converting operations on the substrate 136, such as for example, cutting, embossing, and bonding, as one or more substrates 136 advance through the nip 108. Various examples of tool member configurations that may be used with the anvil rolls 100 herein are described in U.S. Pat. Nos. 4,493,868; 4,854,984; 5,620,779; 5,798,167; 6,244,148; 6,248,195; 7,777,094; 7,861,756; and 8,440,043; and U.S. Patent Publication Nos. 2012/0079926 A1: 2013/0213547 A1: 2013/0218116 A1: 2014/0377513 A1; and 2014/0377506 A1; and European Patent Publication No. EP1635750B1. As previously mentioned, the tool member 134 may be adjacent to the anvil roll 100 and create a nip 108 defined by a minimum distance between the outer circumferential surface 138 of the tool member 134 or cutting roll 146 and the outer circumferential surface 102 of the anvil roll 100.

Figure 6:
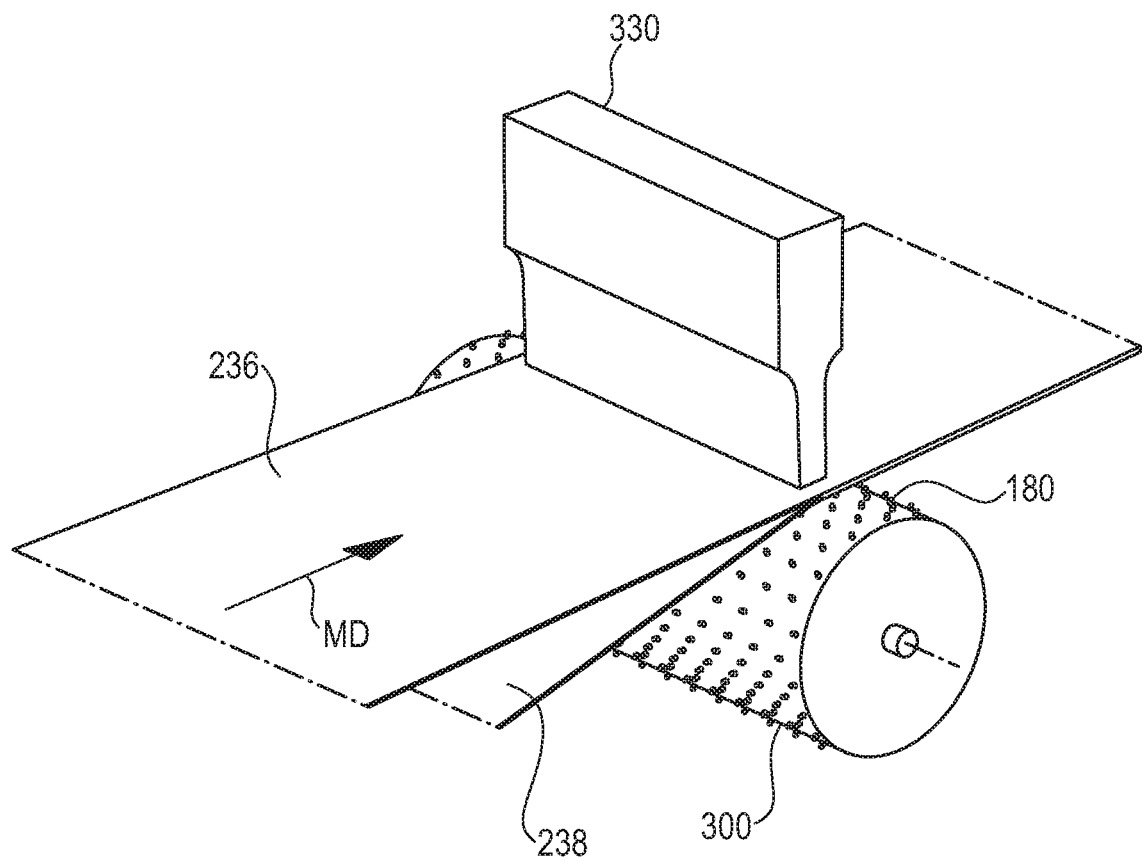
FIG. 6 is a perspective view of an anvil roll and an ultrasonic horn.

FIG. 6 is a perspective view of an anvil roll 300 in combination with an ultrasonic horn 330. This combination, shown in FIG. 6, is a bonding unit used to bond together substrates 236, 238 which are transported through the unit, between the anvil roll 300 and the ultrasonic horn 330, in the machine direction, MD. Vibration of the horn 330 generates heat to melt and bond the substrates 236, 238 together in areas supported by the protrusions 180 on the anvil roll 300. Thus, the bonds and/or bond regions may have shapes that correspond with and may mirror shapes of the protrusions 180. It is to be appreciated that aspects of the ultrasonic bonding devices may be configured in various ways, such as for example linear or rotary type configurations, and such as disclosed for example in U.S. Pat. Nos. 3,113,225; 3,562,041; 3,733,238; 5,110,403; 6,036,796; 6,508,641; and 6,645,330.

In general the pressure applied to the substrates in an ultrasonic bonding unit are lower than the pressure applied in the nip corresponding pressure bonding units described above.

As mentioned above, apparatuses and methods of the present disclosure may be utilized to perform various manufacturing operations on substrates used in the manufacture of absorbent articles. Such substrates may be utilized in absorbent article components such as, for example: backsheets, topsheets, absorbent cores, front and/or back ears, fastener components, and various types of elastic webs and components such as leg elastics, barrier leg cuff elastics, and waist elastics.

dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Examples

Protrusions were built up in layers with 12 pulses of laser as detailed below.

|  | Pulse No. | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Laser Power (%) | 13 | 13 | 9 | 9 | 6 | 6 | 4 | 4 | 3 | 3 | 3 | 3 |
| Pulse length (ms) | 100 | 100 | 100 | 50 | 50 | 100 | 50 | 100 | 50 | 100 | 50 | 100 |
| Powder Amount (%) | 3 |  | 3 |  | 3 |  | 3 |  | 3 |  | 3 |  |

The powder used in each layer was Stellite 6®. Stellite 6® is a cobalt-chromium alloy designed for wear resistance, supplied by Kennametal Inc.

|  | Pulse No. | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Laser Power (%) | 13 | 13 | 9 | 9 | 6 | 6 | 4 | 4 | 3 | 3 | 3 | 3 |
| Pulse length (ms) | 100 | 100 | 100 | 50 | 50 | 100 | 50 | 100 | 50 | 100 | 50 | 100 |
| Powder Amount (%) | 6 Amdry |  | 6 S6 |  | 6 S6 |  | 6 S6 |  | 6 S6 |  | 6 S6 |  |

The dimensions and values disclosed herein are not to be understood as being strictly limited to the exact numerical values recited. Instead, unless otherwise specified, each such The powder used for the first layer was Amdry. Amdry is a thermal spray powder formed from NiCoCrAlY, supplied by Oerlikon Metco. S6 is Stellite 6®.

| | Pulse No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Laser Power (%) | 13 | 13 | 9 | 9 | 6 | 6 | 4 | 4 | 3 | 3 | 3 | 3 |
| Pulse length (ms) | 100 | 100 | 100 | 50 | 50 | 100 | 50 | 100 | 50 | 100 | 50 | 100 |
| Powder Amount (%) | 6 Amdry | | 3 CPM | | 3 CPM | | 3 CPM | | 3 CPM | | 3 CPM | |

CPM 420V® is a high wear resistant tool steel, supplied by Zapp Group.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for making an anvil roll, the method comprising:
    providing a cylindrically-shaped body comprising a first material, wherein the first material is selected from the group consisting of: an iron-based alloy, a nickel-based alloy, an aluminum-based alloy, and a titanium-based alloy, and wherein the body comprises an outer circumferential surface;
    applying a first pulse of energy from a laser source to the outer circumferential surface of the cylindrically-shaped body to form a molten pool on the outer circumferential surface, wherein the molten pool comprises the first material, and wherein the laser source comprises a laser beam;
    initiating a first flow of a powder comprising particulate material to the molten pool to form a layer comprising unmelted particulate material from the powder, wherein the particulate material comprises one or more metallic materials, wherein a diameter of the particulate material is smaller than a diameter of the molten pool and smaller than a diameter of the laser beam;
    mixing the first flow of the powder with the first material in the molten pool;
    stopping the first flow of the powder;
    applying a second pulse of energy from the laser source to the layer comprising unmelted particulate material from the powder to melt all of the particulate material;
    forming a layer comprising melted particulate material;
    after applying the second pulse of energy, applying one or more additional layers to form a plurality of protrusions having a conical or frustro-conical shape comprising tapering sides from a broader base at the outer circumferential surface tapering outwardly towards a narrower tip,
    wherein applying each additional layer comprises:
        applying an additional pulse of energy to the most recently formed layer comprising melted particulate material to form an additional molten pool on the most recently formed layer comprising melted particulate material;
        initiating an additional flow of the powder to the additional molten pool to form an additional layer comprising unmelted particulate material from the powder;
        stopping the additional flow of the powder;
        applying an additional pulse of energy from the laser source to the additional layer comprising unmelted particulate material from the powder to melt all of the particulate material; and
        forming an additional layer comprising melted particulate material, wherein a thickness of the additional layer comprising melted particulate material is less than 0.1 mm.

2. The method of claim 1, further comprising a step of:
    machining the outer tips of the protrusions without applying any machining step to the conical or frustro-conical tapering sides of the protrusions.

3. The method of claim 2, comprising a step of grinding the outer tips of the protrusions.

4. The method of claim 1, wherein the average diameter of the particulate material is less than about 60 micrometers.

5. The method of claim 1, wherein the average diameter of the particulate material is from about 20 to about 50 micrometers.

6. The method of claim 1, wherein the powder is applied in layers, and wherein at least two of the layers comprise different metallic components.

7. The method of claim 1, wherein the laser energy applied to at least two of the successive layers from the laser source is different for each of those layers.

8. The method of claim 1, wherein the particulate material comprises at least one of: powder-metallurgical steel, titanium carbide, niobium carbide, tantalum carbide, chromium carbide, tungsten carbide, and mixtures thereof.

9. The method of claim 1, wherein the powder is applied by a nozzle which is a coaxial nozzle, coaxial with respect to the laser source.

10. The method of claim 6, wherein the thickness of successive layers of the powder is from about 0.01 to about 0.07 mm.

11. The method of claim 1, wherein the volumetric flow rate of the powder is from about 2 to about 10 cm³/hour.

12. The method of claim 1, wherein the dimensional accuracy of the tapering sides of the protrusions is within a tolerance of about 20 micrometers.

13. A method for making an anvil roll, the method comprising:
providing a cylindrically-shaped body comprising a first material, wherein the first material is selected from the group consisting of: an iron-based alloy, a nickel-based alloy, an aluminum-based alloy, and a titanium-based alloy, and wherein the body comprises an outer circumferential surface;
applying a first pulse of energy from a laser source to the outer circumferential surface of the cylindrically-shaped body to form a molten pool on the outer circumferential surface, wherein the molten pool comprises the first material, and wherein the laser source comprises a laser beam;
initiating a first flow of a powder comprising particulate material to the molten pool to form a layer comprising unmelted particulate material from the powder, wherein the particulate material comprises one or more metallic materials, wherein a diameter of the particulate material is smaller than a diameter of the molten pool and smaller than a diameter of the laser beam;
mixing the first flow of the powder with the first material in the molten pool;
stopping the first flow of the powder;
applying a second pulse of energy from the laser source to the layer comprising unmelted particulate material from the powder to melt all of the particulate material;
forming a layer comprising melted particulate material;
after applying the second pulse of energy, applying one or more additional layers to form a plurality of protrusions having a conical or frustro-conical shape comprising tapering sides from a broader base at the outer circumferential surface tapering outwardly towards a narrower tip,
wherein applying each additional layer comprises:
applying an additional pulse of energy to the most recently formed layer comprising melted particulate material to form an additional molten pool on the most recently formed layer comprising melted particulate material;
initiating an additional flow of the powder to the additional molten pool to form an additional layer comprising unmelted particulate material from the powder;
stopping the additional flow of the powder;
applying an additional pulse of energy from the laser source to the additional layer comprising unmelted particulate material from the powder to melt all of the particulate material; and
forming an additional layer comprising melted particulate material, wherein a thickness of the additional layer comprising melted particulate material is less than 0.1 mm, and
wherein the dimensional accuracy of the tapering sides of the protrusions is within a tolerance of about 20 micrometers.

14. The method of claim 13, wherein the average diameter of the particulate material is less than about 60 micrometers.

15. The method of claim 13, wherein the particulate material comprises at least one of: powder-metallurgical steel, titanium carbide, niobium carbide, tantalum carbide, chromium carbide, tungsten carbide, and mixtures thereof.

16. The method of claim 13, wherein the powder is applied in layers, and wherein at least two of the layers comprise different metallic components.

17. The method of claim 13, wherein the powder is applied in layers, and wherein the laser source is operated by pulsing the laser source once per layer and by synchronizing the pulses with the application of successive layers of the powder.

18. The method of claim 17, wherein the laser energy applied to at least two of the successive layers from the laser source is different for each of those layers.

19. The method of claim 1, wherein the initiating the first flow of the powder step is performed after the applying the first pulse of energy step such that the molten pool of the first material is formed prior to the initiating step that directs the unmelted particulate material into the molten pool of the first material to form the layer of the unmelted particulate material in the molten pool of the first material; and
wherein the applying the second pulse of energy step is performed after the initiating step such that the second pulse of energy is directed on the unmelted particulate material in the molten pool of the first material to melt all of the unmelted particulate material in the molten pool of the first material.

20. The method of claim 1, wherein the providing step comprises forming a plurality of holes in the outer circumferential surface of the body and wherein the plurality of holes each extend radially inward from the outer circumferential surface and are configured to be in fluid communication with a vacuum source.

* * * * *